United States Patent [19]

Blot

[11] 4,438,319
[45] Mar. 20, 1984

[54] PROCESS FOR WELDING METAL ARTICLES

[75] Inventor: Roger Blot, Montigny-Cormeilles, France

[73] Assignee: L'Air Liquide, Societe Anonyme pour l'Etude l'Exploitation des Procedes Georges Claude, Paris, France

[21] Appl. No.: 405,166

[22] Filed: Aug. 3, 1982

Related U.S. Application Data

[63] Continuation of Ser. No. 217,665, Dec. 18, 1980, abandoned.

[30] Foreign Application Priority Data

Dec. 27, 1979 [FR] France ................................ 79 31773

[51] Int. Cl.$^3$ ................................................. B23K 9/09
[52] U.S. Cl. ........................... 219/137 PS; 219/130.51
[58] Field of Search ....................... 219/137 PS, 130.51

[56] References Cited

U.S. PATENT DOCUMENTS 3,679,866  7/1972  Arikawa et al. .............. 219/137 PS
4,273,988  6/1981  Iceland et al. ................ 219/137 PS

OTHER PUBLICATIONS

F. A. Vagner et al., "Vertical Pulsating-Arc Welding with Powder-Filled Wire," *Svar, Proiz.*, 1970, No. 5, pp. 18–19, vol. 17.

T. Lyman, ed. *Metals Handbook*, 8th Ed., vol. 6, "Welding and Brazing", 1971, pp. 79–80.

*Primary Examiner*—C. C. Shaw
*Attorney, Agent, or Firm*—Lee C. Robinson, Jr.

[57] ABSTRACT

A method of welding metal articles along a joint using a non-overhanging torch, for example so called butt welds in a vertical or upright position, of the kind which uses a pulsed arc with gaseous protection and a cored wire electrode, is characterized by use of the following combination:

(a) the "pulsed" arc is of the constant frequency pulse type with transfer of molten material at each pulse, without setting up any short circuit, viz. of the "spray arc" kind and (b) the cored wire electrode is of the basic kind.

4 Claims, 1 Drawing Figure

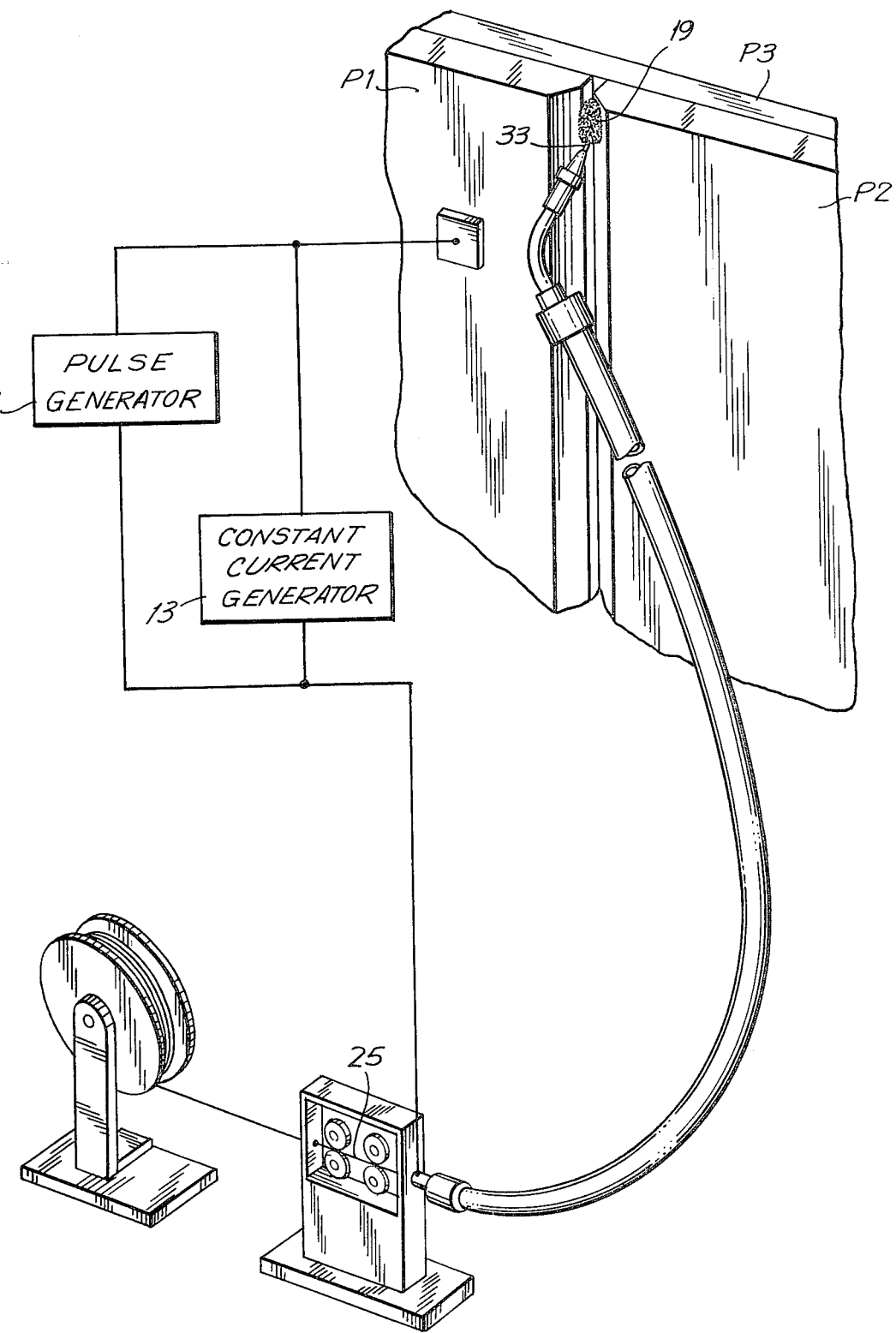

PROCESS FOR WELDING METAL ARTICLES

This is a continuation of application Ser. No. 217,665 filed Dec. 18, 1980, now abandoned.

BACKGROUND OF THE INVENTION

This invention involves a process for pulsed-arc welding a metal article in a non-horizontal position. The invention relates to a method of welding together metal articles along a joint using a non-overhanging torch, as shown generally in the FIGURE, that is to say in welding along a vertical joint such as butt welds in a vertical or upright position or in so-called "horizontal-vertical" welding, along a horizontal line to join two vertically disposed articles.

Generally, this technique is satisfactory when cored wire or consumbale flux coated wire called "rutile" wire is usd, that is to say when a wire is used on which the coating has a basis of titanium dioxide. When it is desired simultaneously to obtain a high coating rate, deep penetration, a limitation to the risks of adhesion and inclusions and especially a high resilience which is also displayed at low and very low temperatures, even afte stress relieving treatment, one is necessarily led to use so-called "basis" cored wires. Briefly the flux or coating on a cored wire comprises:

the metal elements: Fe, Mn, Si or a mixture thereof; small quantities of arc stabilizers e.g. the alkali and alkaline earth metals; and scorifiers which will form the slag.

Generally various types of cored wires are distinguished as a function of the composition of the slag which they form depending upon the scorifiers used, i.e.:

(a) scorifiers rich in rutile $TiO_2$: "rutile" wires;
(b) scorifiers rich in $CaF_2$ "fluorspar" basic wires having the following composition:
$CaF_2$ scorifiers (50%)
other compounds $TiO_2$, $SiO_2$, CaO.

The following is an example given in percentages by weight;
Coating:
$CaF_2$: 55%
MnO: 12% $SiO_2$: 13%
Fe Mn Si: 20%.

These wires are therfore called basic ones because of the basic character of the slag formed and of the scorifiers present. This characteristic is measured by indices such as:

$$basicity = \frac{CaO + CaF_2 + \frac{1}{2}(MnO + FeO)}{SiO_2 + \frac{1}{2}(Al_2O_3 + TiO_2 + ZrO_2)}$$

(the numerical values used being the amounts by weight of the substances in the coating.)

Thus the basicity index of the "basic" cored wire described above is four whilst that for a "rutile" type wire is practically O. A "basic" cored wire is one for which the index of basicity is greater than 2. The quantity of coating introduced within the wire varying according to the manufacturer: the composition of the wire (or of the electrode) will be correlated with this (in particular the percentage by weight of $CaF_2$ in the electrode).

The difference between these different types of cored wires is to be found in the nature of the mechanical properties obtained, principally the notch toughness and tensile characteristics: ultimate tensile strength, yield point, and elongation, after stress relieving treatment. The accepted organizations generally impose, as a function of the type of welded steel:

a minimum notch toughness value, and a tensile strength (in particular a maximum).

By way of example, the following comparative figures are given for notch toughness (charpy V) at $-20°$ C.

|  | Basic Wire | Rutile Wire |
| --- | --- | --- |
| as welded | 13 | 6 |
| after stress relief | 14 | 4 |

It is therefore seen that only one type of basic wire enables high notch toughness values to be obtained and this is the reason why, in certain cases, the use of a "basic" wire is imperative.

Experience has shown that such a basic wire cannot be used in conventional MIG (metal-inert gas) welding technology for out-of-position welding in which the torch does not overhang the joint, as is usually the case in butt welding in a vertical position, as shown in the Figure, or horizontal-vertical welding, because the irregular fusion of such a "basic" wire (in large swirling drops) has the following disadvantages:

(a) it does not permit good separation of the slag in order to keep the metal molten;
(b) the erratic arc catches at various points on the molten metal and heats the entire welding pool, making it more fluid; and
(c) the large drops obtained cannot be controlled and transfer metal at various points, as well as liquefying the entire welding pool.

The only way to ovecome these disadvantages is to use a coated electrode, which involves a difficult operation if performed manually. The present invention aims at ensuring the result sought by using a wire electrode of basic character and a method of welding which facilitates a high degree of automatic working and therefore achieves a great savings.

According to the present invention, there is used
(a) a "pulsed" arc of the constant frequency pulsed kind involving a transfer of molten material with each pulse without setting up a short circuit,
(b) the cored wire electrode being of the basic type.

Experiment has shown that this very specific compromise enables one to obtain in the welding positions considered, a stable welding pool and, as a result of the use of basic cored wires, better values of notch toughness. The pulsed MIG welding technique is directly responsible for this result. The present invention, as well as further objects and advantages thereof, will be understood more clearly and fully from the following description of certain embodiments, with reference to the accompanying drawing.

BRIEF DESCRIPTION OF THE DRAWING

The FIGURE is a simplified representation of a welding torch and associated apparatus being used to weld a workpiece according to an embodiment of the invention.

DETAILED DESCRIPTION OF ILLUSTRATIVE EMBODIMENTS

Referring to the FIGURE, that this method generally includes establishing, either with two generators 11 and 13, or with one electronically controlled generator, an arc at an electrode 33, the current in which consists of a substantially constant base current produced by generator 13 but which has points of greater voltage or pulses produced by generator 11, generally in the shape of half waves which occur regularly and have a constant frequency, generally of the electric power distribution network, whilst maintaining the base current constant between two successive waves.

It is necessary to note that the "pulsed arc" used here, as distinguished from the "short arc", does not produce a short circuit between the electrode 33 and the welding pool as shown at 19. the method of welding according to the invention enables the separation of one or two droplets resulting from the fusion of the end 33 of the electrode wire with the over-voltage of each half-wave, whilst the constant current between any two successive waves ensures the preparatory fusion of the end of the electrode.

The essential advantage of the present invention is to have appreciated—that this "pulsed arc MIG" method which has been used successfully in a very limited number of application could also be used to resolve a problem which has existed for a very long time and which has not been so far resolved, for automatically or semi-automatically welding butt joints in a vertical position, as shown in the Figure, or horizontal-vertical position, this being done by using a cored wire 25 of the basic type.

There are two reasons for the welding pool to be cooler and the fusion smoother in this process than in conventional MIG welding with a basic-type flux cored wire: first, in a conventional fushion process, the drops become relatively larger and hotte because of the large amount of energy required to transfer the drop. The energy transferred is proportional to the area under the $I = f(t)$ curve, and the drop transfer can require peak intensities of up to 400 A for up to 20 ms. With the "pulsed arc" technique, however, the energy transferred to each drop is less, and thus the drops have a lower temperature.

Also, with this technique the fusion of the cord wire electrode is smoother, which enables the arc to be pinpointed on one spot, allowing the rest of the pool to cool down. A simple weaving pattern is theefore sufficient to get a good weld in a vertical or vertical-horizontal position. Different welding operations have thus been carried out and the following method of operation is given by way of example:

Butt joint vertical-position welding automatically or manually performed and with bevelled metal plates P1 and P2, shown in FIG. 1 with their bevelled edges opposed and positioned against a back plate P3 of thickness exceeding 25 mm, utilising a pulsed arc, the constant current of which is 100 amperes with pulses 440 amperes. Five passes were made, including the root pass, using a weaving technique.

The optimum diameter of a basic wire 25 for a pulsation having a frequency of 50 Hz is 1.6 mm. This axial fusion of pulsed arc type which was studied, furnishes a drop diameter approximately equal to the diameter of the wire. Some examples are given:

| Wire (diameter mms) | Transfer type | Speed of fusion of wire m/mn | Average Current (amps) |
|---|---|---|---|
| 1.6 | 1 drop per pulse | 3.2 to 4.2 | 200–260 |
| 1.2 | 1 drop per pulse | 2.4 to 3.1 | 120–140 |
| 1.2 | 2 drops per pulse | 4.8 to 6.2 | 180–220 |

These speeds of fusion of the basic cored wire of diameter 1.6 mm correspond to those currently used with "rutile" wires welding in position and lead to maximum deposition rates. With a diameer of 1.2 mm two drops per pulse are needed to obtain the same quantity of molten metal.

The fusion of a basic pulse-free current wire, that is to say, a fusion by short circuit of the "short arc" type, furnishes, with appropriate parameters, a drop frequency of 20 Hz (wire speed 3.2 m/mn-180 amperes, and, as a result, much larger drops.

Summarising, the use of a pulsed current with a cored wire of basic character enables:

welding butt joints in vertical and horizontal-vertical position because the regularity of the resulting fusion brings about excellent pool behaviour;

carrying out root passes without support for the reason given above; and ensures for the coatings thus obtained the advantages resulting from the use of basic cored wires, viz:

a good deposition rate and good penetration;
limited risk of adhesions and inclusions;
high notch toughness values; and
notably lower operating cost than when using an electrode of the same kind.

I claim:

1. A process for pulsed-arc welding a metal article in a non-horizontal position, comprising the steps of:
   supplying a substantially constant base current having a base current level to a consumable flux coated or cored wire in the torch, the flux being of the basic type, and the substantially constant base current being sufficient to establish an ac between the electrode and the article;
   supplying to the electrode current pulses having a maximum current level and a substantially constant frequency, the current pulses being sufficient to produce a transfer of metal in which no short circuit occurs between the electrode and the articles; and
   protecting the arc and the pulsed transfer of metal with an inert gas.

2. The method of claim 1, wherein the wire has a diameter of substantially 1.6 mm and the average current applied to the electrode is 200 to 260 amperes.

3. The method of claim 1, wherein the wire has a diameter of substantially 1.2 mm and the average current applied to the electrode is 120 to 40 amperes.

4. The method of claim 1, wherein the wire has a diameter of substantially 1.2 mm and the average current applied to the electrode is 180 to 220 amperes.

* * * * *